(12) United States Patent
Miyawaki

(10) Patent No.: US 10,479,247 B2
(45) Date of Patent: Nov. 19, 2019

(54) VEHICLE SEAT

(71) Applicant: TOYOTA BOSHOKU KABUSHIKI KAISHA, Aichi-ken (JP)

(72) Inventor: Yuki Miyawaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 38 days.

(21) Appl. No.: 16/010,867

(22) Filed: Jun. 18, 2018

(65) Prior Publication Data

US 2018/0370404 A1  Dec. 27, 2018

(30) Foreign Application Priority Data

Jun. 21, 2017  (JP) ................................ 2017-121267

(51) Int. Cl.
*B60N 2/70*  (2006.01)
*B60N 2/68*  (2006.01)

(52) U.S. Cl.
CPC ............. *B60N 2/7094* (2013.01); *B60N 2/68* (2013.01)

(58) Field of Classification Search
None
See application file for complete search history.

(56) References Cited

U.S. PATENT DOCUMENTS

| 7,934,774 B2 * | 5/2011 | Galbreath | B60N 2/70 297/452.26 |
| 9,061,610 B2 | 6/2015 | Galbreath et al. | |
| 2007/0236072 A1 * | 10/2007 | Galbreath | B60N 2/70 297/452.27 |
| 2019/0193614 A1 * | 6/2019 | Nakao | A47C 27/15 |

* cited by examiner

*Primary Examiner* — David E Allred
(74) *Attorney, Agent, or Firm* — Greenblum & Bernstein, P.L.C.

(57) ABSTRACT

A vehicle seat including: an elastic support body including a seat pad; and an adjacent member adjacent to the seat pad, wherein a gap is provided between the elastic support body and the adjacent member and extends toward an inner area of the seat in which a frame material is provided, and wherein the elastic support body has a protruding portion which protrudes between the adjacent member and the frame material and is configured to block the gap.

5 Claims, 3 Drawing Sheets

VEHICLE SEAT

CROSS-REFERENCE TO RELATED APPLICATIONS

This application claims priority from Japanese Patent Application No. 2017-121267 filed on Jun. 21, 2017, the entire contents of which are incorporated herein by reference.

TECHNICAL FIELD

The present disclosure relates to a vehicle seat. More specifically, the present disclosure relates to a vehicle seat having a gap which is provided between an elastic support body including a seat pad and an adjacent member adjacent to the seat pad and extends toward an inner area of the seat in which a frame material is provided.

BACKGROUND

There is known a vehicle seat in which a seat cushion is mounted on a vehicle body in a state of being grounded (U.S. Pat. No. 9,061,610). Specifically, a wire frame integrally provided in a pad material of the seat cushion is fixed to a pedestal frame on the vehicle body, so that the seat cushion is mounted on the vehicle body in the state of being grounded.

In the above related art, foreign matters can enter between the seat cushion and the vehicle body from the outside against a resilient force of the pad material, which is not preferable.

SUMMARY

The present disclosure aims to appropriately prevent foreign matters from entering an inside of a vehicle seat through a gap between a seat pad and a member adjacent to the seat pad.

In order to achieve the above object, the vehicle seat of the present disclosure adopts the following means.

An aspect of the present disclosure is a vehicle seat including: an elastic support body including a seat pad; and an adjacent member adjacent to the seat pad, wherein a gap is provided between the elastic support body and the adjacent member and extends toward an inner area of the seat in which a frame material is provided, and wherein the elastic support body has a protruding portion which protrudes between the adjacent member and the frame material and is configured to block the gap.

DETAILED DESCRIPTION

Hereinafter, an embodiment for carrying out the present disclosure will be described with reference to the drawings.

First Embodiment

《Schematic Configuration of Seat 1》
First, a configuration of a seat 1 (vehicle seat) according to a first embodiment will be described with reference to FIGS. 1 to 4. Meanwhile, in the following description, the directions such as a front and rear direction, an upper and lower direction, and a right and left direction refer to the respective directions as indicated in each of the drawings. Further, the "seat width direction" refers to the left and right direction of a seat 1, the "seat height direction" refers to the upper and lower direction of the seat 1, and the "seat front and rear direction" refers to the front and rear direction of the seat 1.

Figure 1:
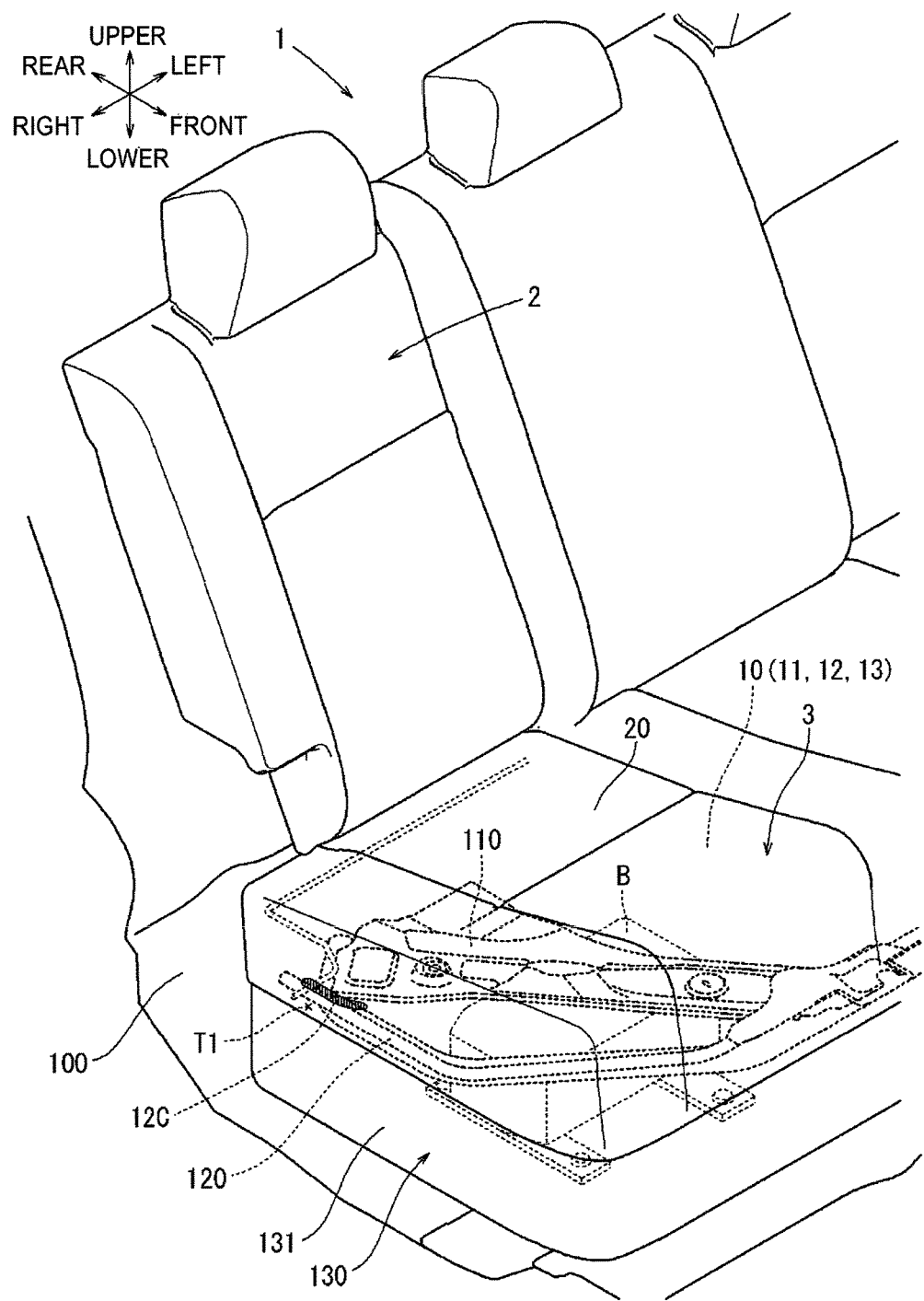
FIG. 1 is a perspective view showing a schematic configuration of a vehicle seat according to a first embodiment.
Figure 2:
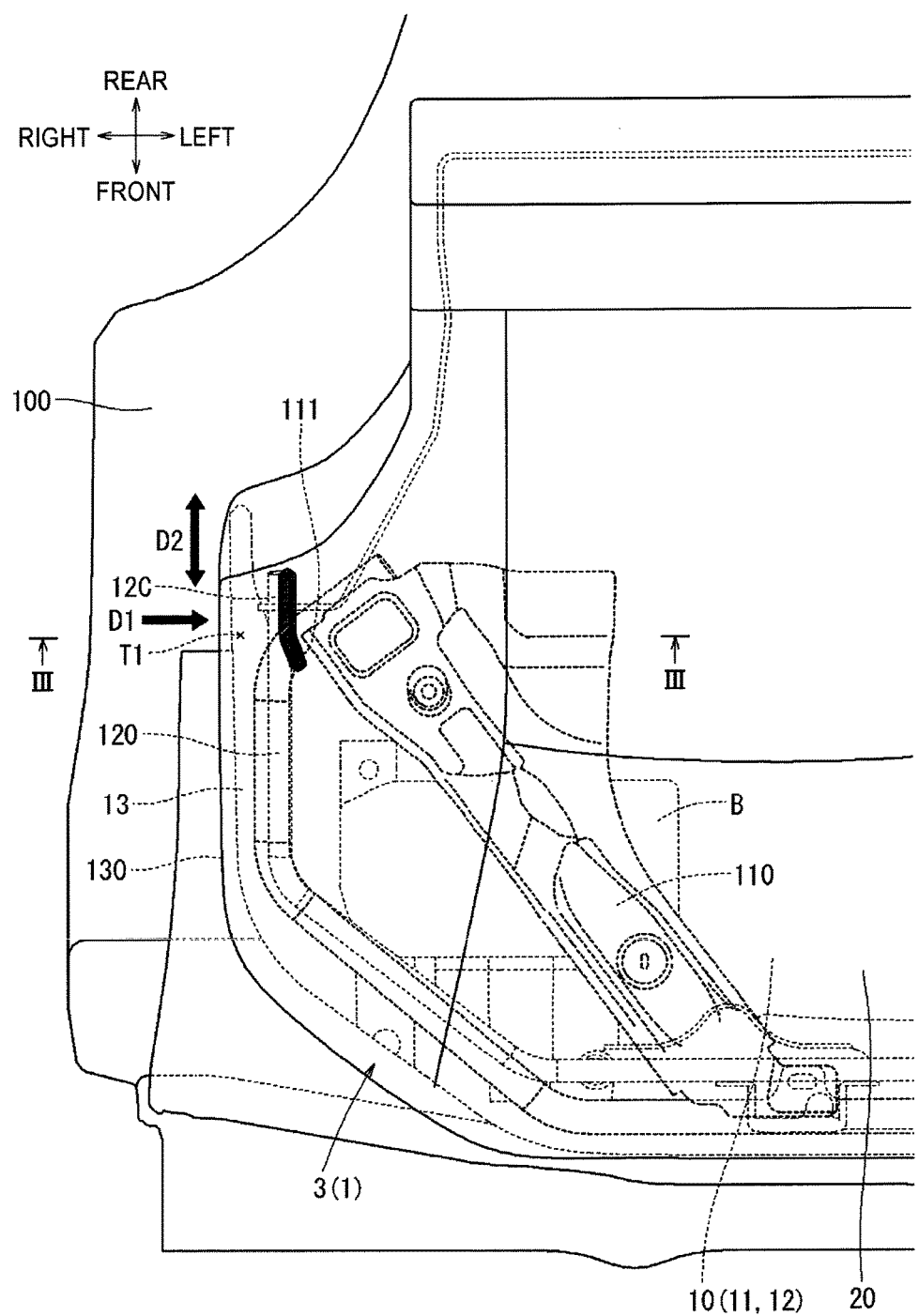
FIG. 2 is a plan view of FIG. 1.

As shown in FIG. 1, the seat 1 of the present embodiment is configured as a rear seat of a hybrid vehicle. Specifically, the seat 1 is configured as a so-called bench seat where two people can seat on the same line. The seat 1 includes a seat back 2 serving as a backrest of a seated person and a seat cushion 3 serving as a seating part. As shown in FIGS. 1 and 2, the seat cushion 3 is provided in such a manner that the seat cushion 3 is inserted from above and integrally fixed on a metal floor panel 100 which constitutes a body panel of the vehicle.

Specifically, the seat cushion 3 mainly includes a cushion body 10 which is placed on the floor panel 100 and elastically receives a load of the seated person, and a fabric cushion cover 20 which covers the entire surface of the cushion body 10 and constitutes a design surface of the seat cushion 3.

Figure 3:
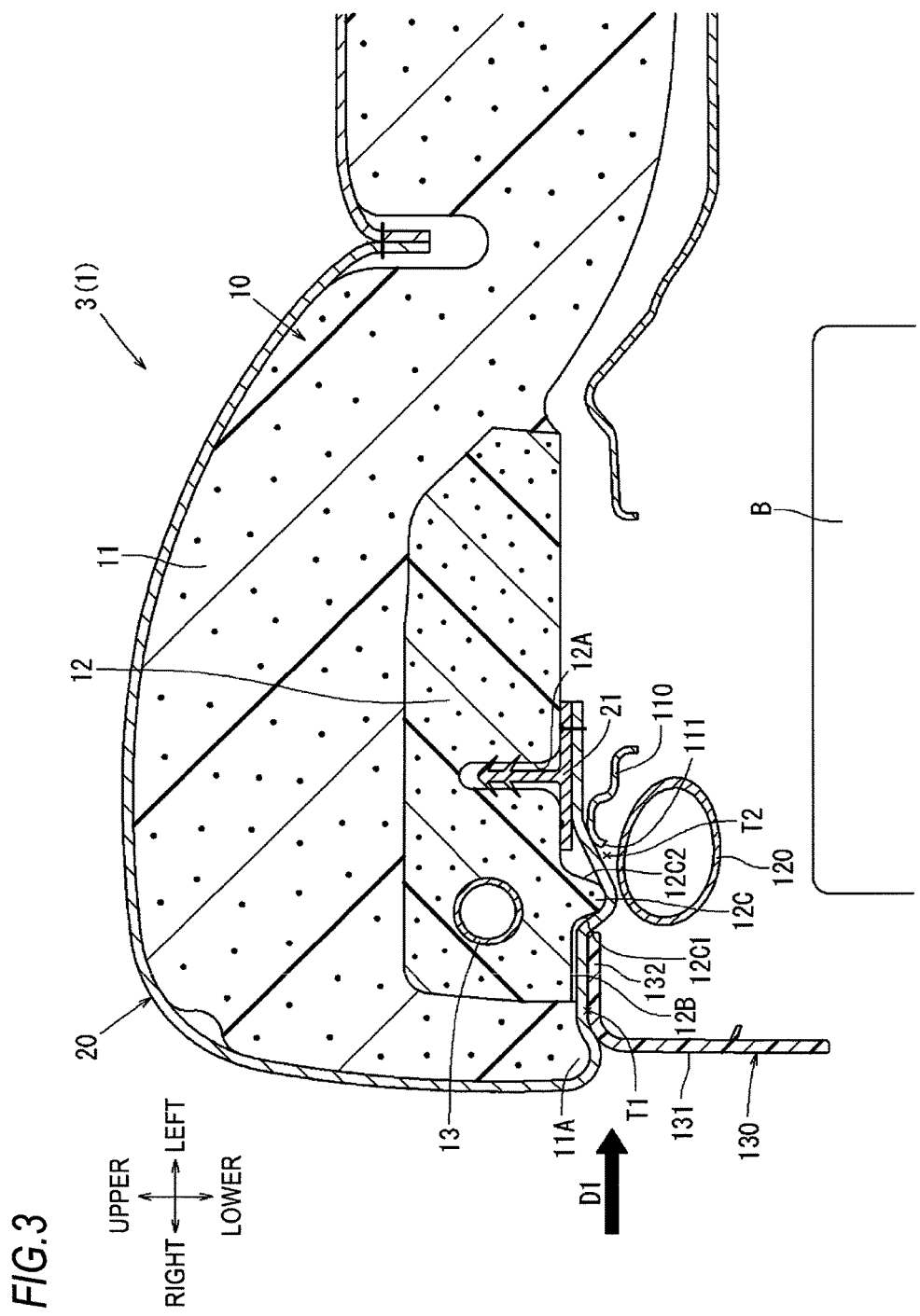
FIG. 3 is a sectional view taken along the line in FIG. 2.

As shown in FIG. 3, the cushion body 10 includes a cushion pad 11 which is made of foamed urethane and constitutes a basic shape of the entire surface of the seat cushion 3, and a bead foam molded body 12 which is made of foamed beads of an olefin-based resin such as polypropylene or polyolefin and is integrally insert-molded on a bottom side region of the cushion pad 11. Here, the cushion body 10 corresponds to the "elastic support body" in the present disclosure, and the cushion pad 11 corresponds to the "seat pad" in the present disclosure.

The cushion pad 11 is configured as a foamed body having a density of about 0.04 g/cm$^3$ capable of exhibiting an appropriate cushioning property. Further, the bead foam molded body 12 is configured as a foamed body having a density of about 0.03 g/cm$^3$ which is lower than that of the cushion pad 11. The bead foam molded body 12 is configured to be harder and lighter than the cushion pad 11. Since the bead foam molded body 12 is inserted in the bottom side region of the cushion pad 11, the cushion body 10 is configured to be lighter while maintaining an appropriate cushion property and holdability when a large load is inputted.

A metal inserted frame 13 constituting an internal framework along an outer peripheral edge of the cushion body 10 is provided in the cushion body 10 in a state of being integrally inserted through the inside of the bead foam molded body 12. Latch wires (not shown) are provided to extend downward from several places of the inserted frame 13. The latch wires are inserted from above into resin hooks (fixed portions; not shown) provided at corresponding places on the floor panel 100 and are hooked to these hooks (not shown), respectively. In this way, the cushion body 10 having such a configuration is integrally fixed on the floor panel 100.

The cushion cover 20 is covered on the cushion body 10 from above. Then, front, rear, left and right peripheral edges of the cushion cover 20 are drawn to the back side of the cushion body 10, respectively. Resin clips 21 sewn to these peripheral edges are fixed by being respectively fitted from below into slit-like fitting holes 12A formed in the bead foam molded body 12 on the bottom side region of the cushion body 10. In this way, the cushion cover 20 is provided in a state of being stretched widely in close contact with the cushion body 10. With this stretching, the cushion cover 20 is integrally attached to the cushion body 10.

By the way, as shown in FIGS. 1 and 2, a battery B for driving a hybrid vehicle is provided in a region immediately below the seat cushion 3 such that the battery B is embedded under the floor panel 100. Further, also with this, in a partial region on the floor panel 100 under which the battery B is embedded, a pedestal frame 110 made of a metal panel and serving as a reinforcement member is provided so as to protect the arrangement region of the battery B from above. The pedestal frame 110 is integrally bridged so as to obliquely cross over the arrangement region of the battery B from the front inner side (left front side) to the rear outer side (right rear side). The pedestal frame 110 is formed in a panel shape in which its panel surface faces in the seat height direction and undulating bead-like portions are provided at several places.

Furthermore, the pedestal frame 110 is provided with a pedestal pipe 120 made of a round metal pipe material. The pedestal pipe 120 is bent so as to protrude forward and outward from the pedestal frame 110 in a state where both end portions thereof are integrally welded to a front inner side (left front side) end and a rear outer side (right rear side) end of the pedestal frame 110.

The pedestal frame 110 has curved surface portions bent upward in an arcuate surface at a front inner side (left front side) end and a rear outer side (right rear side) end of the pedestal frame 110. A front inner side (left front side) end and a rear outer side (right rear side) end of the pedestal pipe 120 are butted and welded in a state of being brought into surface contact with the curved surface portions at the front inner side (left front side) end and the rear outer side (right rear side) end of the pedestal frame 110, respectively. Specifically, the pedestal pipe 120 is bent in a shape extending along an inner surface direction of the floor panel 100 and extending in a region immediately below an outer peripheral edge from a right portion to a front portion of the seat cushion 3. Both end portions of the pedestal pipe 120 are respectively welded to the pedestal frame 110 and integrally coupled thereto.

Further, as shown in FIGS. 1 and 3, a resin pedestal cover 130 is attached to an underbody of the right surface portion of the seat cushion 3. The pedestal cover 130 covers a space between the floor panel 100 and the right surface portion of the seat cushion 3 with respect to the outside. The pedestal cover 130 is provided in a state of being integrally attached to the floor panel 100. As shown in FIG. 3, the pedestal cover 130 is formed in a substantially inverted L-shaped plate shape which has a standing plate portion 131 and an eaves-shaped top plate portion 132. The standing plate portion 131 extends in a standing manner from the floor panel 100 in a region immediately below the right surface portion of the seat cushion 3. The top plate portion 132 extends in a shape bent from an upper edge of the standing plate portion 131 toward the inner side (left side) in the seat width direction.

The pedestal cover 130 is provided in such a manner that the standing plate portion 131 extending in a standing manner from the floor panel 100 covers the pedestal frame 110 and the pedestal pipe 120 from the outer side (right side) in the seat width direction and the top plate portion 132 extending in a shape bent from the upper edge of the standing plate portion 131 toward the inner side (left side) in the seat width direction extends toward the inner side (left side) in the seat width direction at the same height position as the rear outer side (right rear side) end of the pedestal frame 110 welded to the upper surface portion of the pedestal pipe 120 at a position higher than the pedestal pipe 120.

The seat cushion 3 has a bulging portion 11A formed in a partially bulged shape on the bottom surface portion of the peripheral portion of the cushion pad 11 on the outer side (right side) in the seat width direction. With respect to the pedestal cover 130 having above configuration, the seat cushion 3 is set in such a manner that the bulging portion 11A is elastically pressed on the top plate portion 132 of the pedestal cover 130 with the cushion cover 20 covering the bulging portion 11A interposed therebetween. With the above assembly, a gap T1 between the right surface portion of the seat cushion 3 and the pedestal cover 130 is maintained as a closed state in which a resilient force exerted by the bulging portion 11A of the cushion pad 11 prevents foreign matters from entering from the outside.

However, when foreign matters are pushed into the gap T1 between the right surface portion of the seat cushion 3 and the pedestal cover 130 against the resilient force exerted by the bulging portion 11A of the cushion pad 11, there is a possibility that the foreign matters pass through the gap T1 between the bottom surface of the seat cushion 3 and the top plate portion 132 of the pedestal cover 130 and enter into an inner area of the seat (corresponding to an entering direction D1 of the gap T1) in which a corner portion 111 on the rear outer side (right rear side) of the pedestal frame 110 is provided.

Therefore, in order to prevent the foreign matters from entering the inner area of the seat, a protruding portion 12C is formed on a bottom surface 12B of the bead foam molded body 12 positioned over the pedestal frame 110 and the top plate portion 132 of the pedestal cover 130 of the cushion body 10 from above. The protruding portion 12C protrudes in a mountain shape from the upper side toward the inside of a gap T2 in the seat width direction between the pedestal frame 110 and the top plate portion 132 of the pedestal cover 130. Here, the pedestal frame 110 corresponds to the "frame material" in the present disclosure, and the pedestal cover 130 corresponds to the "adjacent member" in the present disclosure.

《Configuration of Protruding Portion 12C》

As shown in FIG. 3, the protruding portion 12C has a substantially mountain shape in a cross section protruding downward from the bottom surface 12B of the bead foam molded body 12. Specifically, the protruding portion 12C is formed in a cross section of a substantially mountain shape which has an outer inclined surface 12C1 and an inner inclined surface 12C2. The outer inclined surface 12C1 is inclined downward to the inner side (downward to the left side) at the outer surface (right surface) in the seat width direction facing the entering direction D1 of the gap T1. The inner inclined surface 12C2 is inclined upward to the inner side (upward to the right side) at the inner surface (left surface) in the seat width direction on the side opposite to the outer inclined surface 12C1. A protruding tip end and a base side end of the protruding portion 12C are formed into a rounded shape, respectively.

As shown in FIG. 3, in a state before a load of a seated person is applied to the seat cushion 3, the protruding portion 12C is provided in the gap T2 between the pedestal frame 110 and the top plate portion 132 of the pedestal cover 130 as a state of protruding downward to a position below the top plate portion 132. With the above configuration, in the state before the load of the seated person is applied to the seat cushion 3, the protruding portion 12C is provided as a state of protruding so as to completely block the gap T1 between the right surface portion of the seat cushion 3 and the pedestal cover 130 in the seat height direction at a position on the outer side (right side) of the corner portion 111 of the pedestal frame 110.

The protruding portion 12C is formed in the bead foam molded body 12 which is harder than the cushion pad 11. Therefore, even when the bulging portion 11A is pushed and bent such that the gap T1 is widened upward by a force received from the outside, the protruding portion 12C is difficult to be pushed and bent in accordance with the pushing and bending of the bulging portion 11A. In this way, it is possible to hold the gap T1 in a state of being stably blocked from the inside.

Further, the protruding portion 12C is configured to be covered with the cushion cover 20 in a state of being entirely stretched from the bottom side. When foreign matters enter the gap T1, the foreign matters are not directly brought into contact with the outer inclined surface 12C1 of the protruding portion 12C. Through a tension of the cushion cover 20 stretched in a state of being floated from the outer inclined surface 12C1, a repulsive force (resistance force) by the cushion cover 20 gradually becomes stronger as the foreign matters enter the gap T1 in the entering direction D1. Thus, the foreign matters are brought into contact with the protruding portion 12C so that the foreign matters can be elastically received by the protruding portion 12C.

When the load of the seated person is applied to the seat cushion 3, the protruding portion 12C adopts a mode in which the bottom surface 12B of the bead foam molded body 12 positioned over the top plate portion 132 of the pedestal cover 130 is pushed down to a position where it is put on the top plate portion 132. In this way, the gap T1 between the right surface portion of the seat cushion 3 and the pedestal cover 130 is more strongly narrowed and the protruding portion 12C is pushed further downward to more strongly block the gap T1.

As shown in FIG. 2, the protruding portion 12C is formed in an elongated shape in which the formation position of the corner portion 111 on the rear outer side (right rear side) of the pedestal frame 110 extends over the seat front and rear direction D2 intersecting with the entering direction D1 of the gap T1. With the above configuration, even when foreign matters enter the gap T1 from the position deviated from the formation position of the corner portion 111 in the seat front and rear direction D2, the foreign matters are widely prevented from interfering with the corner portion 111 of the pedestal frame 110.

SUMMARY

To summarize the above, the seat 1 of the present embodiment has the following configurations. That is, the vehicle seat (1) includes the elastic support body (10) including the seat pad (11); and the adjacent member (130) adjacent to the seat pad (11), wherein the gap (T1) is provided between the elastic support body (10) and the adjacent member (130) and extends toward an inner area of the seat in which the frame material (110) is provided, wherein the elastic support body (10) has a protruding portion (12C) which protrudes between the adjacent member (130) and the frame material (110) and is configured to block the gap (T1).

With such a configuration, since the elastic support body (10) including the seat pad (11) has the protrusion portion (12C), and even when foreign matters enter the gap (T1) between elastic support body (10) and the adjacent member (130), the protruding portion (12C) prevents the foreign matters from entering to the position where the frame material (110) is provided. Therefore, it is possible to appropriately prevent foreign matters from entering, through the gap (T1), the inner area of the seat in which the frame material (110) is provided.

Further, the elastic support body (10) has a configuration that the seat pad (11) is made of urethane foam and the bead foam molded body (12) made of foamed beads having a density lower than the urethane foam is integrated with the seat pad (11), and the protruding portion (12C) is formed at the bead foam molded body (12).

With such a configuration, it is possible to simply form the protruding portion (12C) to be rigid by using the configuration of the bead foam molded body (12).

Further, the protruding portion (12C) has a shape extending along the direction (D2) intersecting with the entering direction (D1) of the gap (T1) that extends toward the inner area of the seat.

With such a configuration, the protruding portion (12C) can appropriately prevent foreign matters from entering through the gap (T1) between the elastic support body (10) and the adjacent member (130) over a wide range.

Further, the protruding portion (12C) has a mountain shape protruding in a form inclined in the entering direction (D1) of the gap (T1) that extends toward the inner area of the seat.

With such a configuration, the protruding portion (12C) is configured to spread at the base and have a high structural strength, thereby making it difficult to be crushed or bent by being pressed.

Further, the protruding portion (12C) has a shape protruding in a form that is configured to cross the gap (T1) in a vertical direction of the seat.

Other Embodiments

Although the embodiments of the present disclosure have been described above using one embodiment, the present disclosure can be implemented in various forms other than the above embodiment. For example, the "vehicle seat" of the disclosure may be widely applied to seats provided for various vehicles other than automobiles, such as trains, aircrafts or ships, in addition to the seats of the automobile other than the rear seat.

Further, the configuration in which the gap is provided between the elastic support body including the seat pad and the adjacent member adjacent to the seat pad and extends toward the in-seat region in which the frame material is provided is not limited to the configuration between a seat cushion and a resin cover (such as the pedestal cover 130 shown in the first embodiment) provided on the vehicle body. For example, the configuration between arbitrary members, such as the configuration between a seat back and a side garnish and the configuration between a seat back or a seat cushion and a shield covering a peripheral side surface portion thereof may be applied, so long as the configuration can be provided between a seat forming member and a member adjacent thereto.

Further, the protruding portion may be formed so as to protrude from the seat pad, in addition to the bead foam molded body. Further, the protruding portion may be configured by attaching a separate member to the elastic support body or a seat cover covering the elastic support body. Further, the protruding portion may protrude in a cylindrical shape, in addition to the mountain shape protruding in a form inclined in the entering direction of the gap that extends toward the inner area of the seat. Further, the portion of the frame material where the access is blocked by the protruding portion is not limited to the corner portion of the frame material, but may be portions other than the edges of the frame material.

What is claimed is:

1. A vehicle seat comprising:
    an elastic support body including:
        a seat pad; and
        a structural molded foam body integrated into a lower surface of the seat pad; and
    an adjacent member subjacent to the seat pad and the structural molded foam body,
    wherein a gap is provided between the elastic support body and the adjacent member and the gap extends from an outer surface toward an inner area of the seat in which a frame material is provided,
    wherein the structural molded foam body has a protruding portion which protrudes downwardly between the adjacent member and the frame material and is configured to block the gap,
    wherein the structural molded foam body is harder and has a lower density compared to the seat pad.

2. The vehicle seat according to claim 1, wherein the elastic support body has a configuration that the seat pad is made of urethane foam and the structural molded foam body comprises a bead foam molded body made of foamed beads.

3. The vehicle seat according to claim 1, wherein the protruding portion has a shape intersecting with an entering direction of the gap.

4. The vehicle seat according to claim 1, wherein the protruding portion has an inverted mountain shape protruding in a form inclined in an entering direction of the gap.

5. The vehicle seat according to claim 1, wherein the protruding portion has a shape protruding in a form that is configured to cross the gap in a vertical direction of the seat.

* * * * *